United States Patent Office 3,538,113
Patented Nov. 3, 1970

3,538,113
N-SUBSTITUTED PHTHALIMIDINES
William J. Houlihan, Mountain Lakes, N.J., assignor to Sandoz-Wander, Inc., Hanover, N.J., a corporation of Delaware
No Drawing. Filed Dec. 23, 1966, Ser. No. 604,173
Int. Cl. C07d 27/50
U.S. Cl. 260—325                                          6 Claims

ABSTRACT OF THE DISCLOSURE

There are prepared N-(β-aminoethyl)-phthalimidines, such as 2-(β-aminoethyl)-3-(p-chlorophenyl)phthalimidine, by reducing imidazo[2,1 - a]isoindol-5-ones. The phthalimidines are useful as psychic energizers.

This invention relates to phthalimidine derivatives. In particular, the invention pertains to N-(β-aminoethyl)-phthalimidine compounds and a process for preparing the same.

The phthalimidine compounds with which the present invention is concerned may be represented structurally as follows:

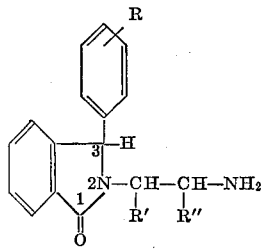

where
R represents hydrogen; chloro; fluoro; trifluoromethyl; and
each of R' and R" are the same and represent hydrogen; straightchain lower alkyl, preferably containing from 1 to 4 carbon atoms, i.e., methyl, ethyl, propyl or butyl; phenyl; monochloro substituted phenyl or monofluoro substituted phenyl.

The compounds of structural Formula I wherein R is as defined and R' and R" are other than phenyl or substituted phenyl but as otherwise defined, have been disclosed generically in U.S. Pat. 3,091,568. However, such compounds cannot be prepared by any of the processes described in said patent or by any other processes heretofore known in the prior art.

In accordance with the present invention the compounds of structural Formula I are prepared by chemically or catalytically reducing a 9b - phenyl-1,2,3,9b-tetrahydro-5H-imidazo[2,1-a]isoindol-5-one as illustrated by the following reaction scheme:

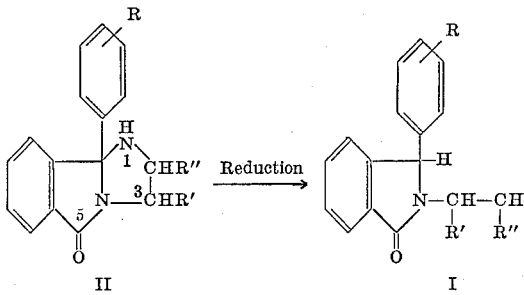

wherein R, R' and R" are as previously defined.
Chemical reduction of the isoindolone (II) is most conveniently carried out in an inert ether solvent, e.g., tetrahydrofuran and diethyl ether, employing lithium aluminum hydride as the reducing agent. The temperature at which the reduction is effected is critical and should not exceed about 35° C. Preferably, the reaction temperature is in the range of from about 15° to about 35° C.

Catalytic reduction is most readily effected in an inert organic solvent, desirably a lower aliphatic acid, preferably a lower aliphatic acid, preferably acetic acid, and in the presence of a platinum catalyst, e.g., platinum, platinum-carbon, platinum-alumina, platinum-asbestos and platinum dioxide. The reduction may be carried out at room temperature (20–25° C.) or at elevated temperatures of up to about 75° C. Preferably, the temperature is in the range of from about 20° to about 30° C. and the hydrogen pressure is in the range of from about 15 to about 100 p.s.i.

Various of the starting compounds of Formula II and their preparation have been described in the literature (see, e.g., Netherlands Pat. 6,501,647, published Aug. 12, 1965). Such others which are not specifically described in the literature (e.g., compounds wherein R' and R" are other than hydrogen) may be prepared in analogous manner by reacting an appropriate benzoylbenzoic acid with a 1,2-disubstituted ethylenediamine as illustrated by the following reaction scheme:

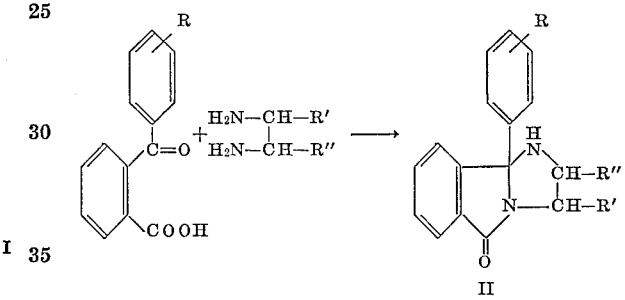

wherein R, R' and R" are as previously defined.
The compounds of Formula II wherein R' and R" are other than hydrogen exist in meso, racemic or optically active forms. In carrying out the process of the present invention it is preferred to use the meso form of such compounds which is readily obtainable by starting with a meso-1,2-disubstituted ethylenediamine.

The compounds of structural Formula I are useful because they possess pharmacological activity in animals. In particular, such compounds are central nervous system stimulants and can be used as psychic energizers. For such usage the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. Furthermore, the compounds may be similarly administered in the form of their non-toxic pharmaceutically acceptable acid addition salts. Such salts possess the same order of activity as the free base, are readily prepared in conventional manner by reacting the base with the appropriate acid and accordingly are included within the scope of the invention. Representative of such salts are the mineral acid salts such as the hydrobromide, hydrochloride, sulfate, phosphate and the like and the organic acid salts such as the succinate, benzoate, acetate, maleate, p-toluenesulfonate, benzenesulfonate and the like.

For the above-mentioned use, the dosage administered will, of course, vary depending upon the compound employed and the mode of administration. However, in general, satisfactory results are obtained when administered at a daily dosage of from about 50 milligrams to about 100 milligrams per kilogram of animal body weight, preferably given in divided doses, 2 to 4 times a day, or in sustained release form. For most mammals the daily dosage is from about 200 milligrams to 400 milligrams and dosage forms suitable for internal administration comprise from about 50 milligrams to about 200 milligrams of the compound admixed with a solid or liquid pharmaceutical carrier or diluent.

A representative formulation is a tablet (prepared by standard tabletting techniques) and containing the following ingredients.

| Ingredient: | Parts by weight |
|---|---|
| 2-(β-aminoethyl)-3-phenylphthalimidine | 50 |
| Tragacanth | 2 |
| Lactose | 39.5 |
| Corn starch | 5 |
| Talcum | 3 |
| Magnesium stearate | 0.5 |

The following examples show representative compounds encompassed within the scope of this invention and the manner in which such compounds are prepared.

EXAMPLE 1

2-(β-aminoethyl)-3-phenylphthalimidine

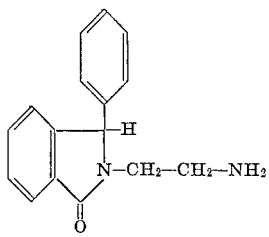

To a flask equipped with a stirrer, thermometer, dropping funnel and gas inlet tube, and blanketed with nitrogen, is added 200 ml. of dry tetrahydrofuran and 2.5 g. (0.066 mole) of lithium aluminum hydride. To the resulting mixture is added, dropwise with stirring, over a 45 minute period, a solution of 15.0 g. (0.06 mole) of 9b - phenyl - 1,2,3,9b - tetrahydro - 5H - imidazo[2,1 - a]isoindol-5-one in 250 ml. of dry tetrahydrofuran. The resulting mixture is stirred for an additional 6 hours at room temperature, then cooled in an ice-bath and treated with 5 ml. of 2 N sodium hydroxide and 7.5 ml. of water. The resulting mixture is dried by the addition of 25 g. of anhydrous sodium sulfate, filtered and the filtrate concentrated in vacuo on a rotary evaporator. The residue is crystallized from methanol-water (2:1) to obtain 2-(β-aminoethyl)-3-phenylphthalimidine, M.P. 87–89° C.

*Analysis.*—Calcd. for $C_{16}H_{16}N_2O$ (percent): C, 76.2; H, 6.4; N, 11.1; O, 6.3. Found (percent): C, 76.5; H, 6.8; N, 10.6; O, 6.2.

Infrared: KBr Pellet Bands at 2.96, 5.98, 6.18 and 7.12μ.

Nuclear magnetic resonance: $CDCl_3$

| —NH₂ | 1.48 p.p.m., singlet, exchanges with D₂O. |
|---|---|
| —CH₂CH₂— | 3H centered at 2.91 and 1H at 3.91 p.p.m. |
| —C—H | 5.62 singlet. |
| 9 | aromatic protons in 7.0–8.0 p.p.m. region. |

Mass spectrum: Parent peak at 252. Other significant peaks at 234, 222, 210, 194, 165, 146, 131, 117, 104 and 19.

The free base is dissolved in methylene chloride-tetrahydrofuran (2:1) and the resulting solution treated with dry hydrogen chloride gas. The salt thus obtained is filtered off and recrystallized from methanol-diethyl ether (3:1) to obtain 2-(β-aminoethyl)-3-phenylphthalimidine hydrochloride, M.P. 252–255° C.

EXAMPLE 2

2-(β-aminoethyl)-3-(p-chlorophenyl)phthalimidine

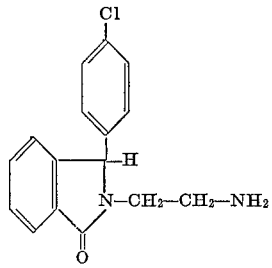

To a flask equipped with a stirrer, thermometer, dropping funnel, reflux condenser and gas inlet tube, and blanketed with nitrogen, is added 1000 ml. of dry tetrahydrofuran and 10.0 g. (0.263 mole) of lithium aluminum hydride. The resulting mixture is stirred and then treated dropwise with a solution of 30.0 g. (0.105 mole) of 9b - (p - chlorophenyl) - 1,2,3,9b - tetrahydro - 5H-imidazo[2,1-a]isoindol-5-one in 150 ml. of anhydrous tetrahydrofuran. The addition rate is controlled such that the reaction temperature does not exceed 30° C. The resulting mixture is stirred for an additional 6 hours at room temperature, then cooled in an ice-bath and treated with 100 ml. of ethyl acetate, 20 ml. of 2 N sodium hydroxide and 30 ml. of water. The resulting mixture is filtered, the filtrate dried by the addition of anhydrous sodium sulfate, the drying agent removed by filtration and the dried filtrate evaporated in vacuo on a rotary evaporator. The residue is crystallized from tetrahydrofuran-diethyl ether (2:1) and the resulting crystalline material dissolved in chloroform and the chloroform solution chromatographed on a Silica Gel column (250 g.). The column is then eluted with a mixture of chloroform-methanol (98:2) and the eluant treated with dry hydrogen chloride gas to obtain 2-(β-aminoethyl)-3-(p-chlorophenyl)phthalimidine hydrochloride, M.P. 294–296° C.

The free base, M.P. 82–85° C., is obtained by treatment of the salt with sodium hydroxide in conventional manner.

*Analysis.*—Calcd. for $C_{16}H_{15}ClN_2O$ (percent): C, 67.1; H, 5.2; Cl, 12.4; N, 9.7; O, 5.6. Found (percent): C, 67.4; H, 5.5; N, 9.8.

Nuclear magnetic resonance: $CDCl_3$

| —NH₂ | 1.35 p.p.m., singlet, exchanges with D₂O. |
|---|---|
| —CH₂CH₂— | 3H centered at 2.89 and 1H centered at 3.88 p.p.m. |
| —C—H | 5.58 p.p.m., singlet. |
| 8 | aromatic protons in 6.98–8.00 p.p.m. region. |

EXAMPLE 3

2-(meso-2-amino-1,2-diphenylethyl)-3-(p-chlorophenyl) phthalimidine

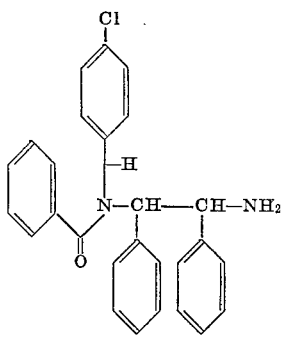

A Parr hydrogenation bottle containing 15.0 g. (0.032 mole) of meso-2,3-diphenyl-9b-(p-chlorophenyl)-1,2,3,9b-tetrahydro-5H-imidazo[2,1-a]isoindol-5-one, 0.5 g. platinum oxide and 200 ml. of acetic acid is hydrogenated at room temperature and an initial hydrogen pressure of 39.0 p.s.i. After one equivalent of hydrogen is consumed the reaction is terminated, the catalyst filtered off and the filtrate concentrated in vacuo on a rotary evaporator. The residue is dissolved in water and the resulting solution treated with 50 ml. of concentrated ammonium hydroxide. The resulting precipitate is recovered by filtration, dissolved in ethyl acetate and the resulting solution dried by the addition of anhydrous magnesium sulfate. The magnesium sulfate is filtered off and the filtrate concentrated to about one-fourth of its volume to obtain 2-(meso-2-amino-1,2-diphenylethyl) - 3 - (p-chlorophenyl) phthalimidine, M.P. 173–174.5° C.

A solution of the free base in methylene chloride is treated with dry hydrogen chloride gas to obtain 2-(meso-2-amino-1,2-diphenylethyl) - 3 - (p-chlorophenyl)phthalimidine hydrochloride, M.P. 283–285° C.

EXAMPLE 4

Preparation of meso-2,3-diphenyl-9b-(p-chlorophenyl)-1,2,3,9b-tetrahydro-5H-imidazo[2,1-a]isoindol-5-one

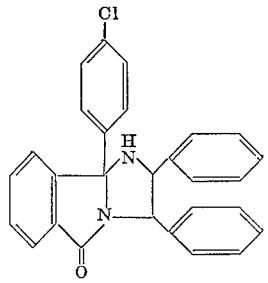

To flask equipped with a stirrer, condenser and Dean-Stark tube is added 13.1 g. (0.05 mole) of o-(p-chlorobenzoyl)benzoic acid, 14.7 g. (0.07 mole) of meso-1,2-diphenylethylenediamine, 0.5 g. of p-toluenesulfonic acid and 500 ml. of toluene. The mixture is stirred and refluxed until water ceases to separate in the Dean-Stark tube. The resulting mixture is then evaporated in vacuo on a rotary evaporator and the residue crystallized from methylene chloride/diethyl ether (1:1) to obtain meso-2,3-diphenyl - 9b - (p - chlorophenyl)-1,2,3,9b-tetrahydro-5H-imidazo[2,1-a]isoindol-5-one, M.P. 231° C.

What is claimed is:

1. A compound selected from the group consisting of phthalimidines of the formula

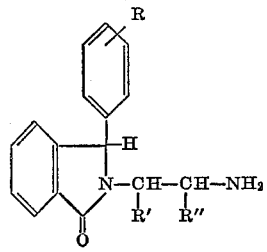

and the non-toxic acid addition salts thereof, wherein
R represents chloro or fluoro; and
R' and R" are the same and represent hydrogen, phenyl, chlorophenyl or fluorophenyl.

2. A compound of claim 1 wherein R is as defined in claim 1 and R' and R" are the same and represent phenyl, chlorophenyl or fluorophenyl.

3. The compound of claim 1 which is 2-(β-aminoethyl)-3-(p-chlorophenyl)phthalimidine.

4. The compound of claim 2 which is 2-(2-amino-1,2-diphenylethyl)-3-(p-chlorophenyl)phthalimidine.

5. A process for preparing a compound of claim 1 in free base form which comprises contacting a compound of the formula

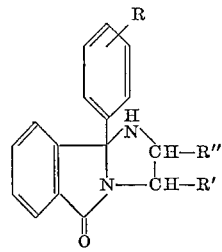

wherein R, R' and R" are as defined in claim 1, with lithium aluminum hydride in an inert ether solvent and at a temperature of from about 15° C. to about 35° C.

6. A process for preparing a compound of claim 1 in free base form which comprises contacting a compound of the formula

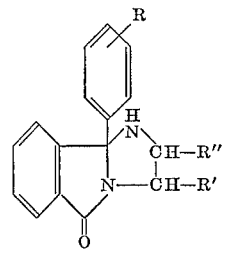

wherein R, R' and R" are as defined in claim 1, with hydrogen in an inert organic solvent and in the presence of a platinum catalyst.

References Cited

UNITED STATES PATENTS 3,091,568   5/1963   Bub _____ 260—325 XR

ALEX MAZEL, Primary Examiner

J. A. NARCAVAGE, Assistant Examiner

U.S. Cl. X.R.

260—309.7; 424—274